(12) United States Patent
Li et al.

(10) Patent No.: US 10,540,367 B2
(45) Date of Patent: Jan. 21, 2020

(54) METHOD AND APPARATUS FOR DATA PROCESSING IN DATA MODELING

(71) Applicant: Huawei Technologies Co., Ltd., Shenzhen (CN)

(72) Inventors: Chen Li, Shenzhen (CN); Weiguo Tan, Shenzhen (CN); Fangshan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 15/631,864

(22) Filed: Jun. 23, 2017

(65) Prior Publication Data

US 2017/0300546 A1 Oct. 19, 2017

Related U.S. Application Data

(63) Continuation of application No. PCT/CN2015/086868, filed on Aug. 13, 2015.

(30) Foreign Application Priority Data

Dec. 23, 2014 (CN) .......................... 2014 1 0814222

(51) Int. Cl.
*G06N 20/00* (2019.01)
*G06N 5/00* (2006.01)
(Continued)

(52) U.S. Cl.
CPC .............. *G06F 16/26* (2019.01); *G06N 20/00* (2019.01); *G06F 16/2465* (2019.01);
(Continued)

(58) Field of Classification Search
CPC ..... G06F 16/26; G06F 16/2465; G06N 20/00; G06Q 40/08
(Continued)

(56) References Cited

U.S. PATENT DOCUMENTS 6,865,582 B2 3/2005 Obradovic et al.
2017/0300546 A1\* 10/2017 Li ....................... G06F 16/2465

FOREIGN PATENT DOCUMENTS

CN 101499075 A 8/2009
CN 101799808 A 8/2010
(Continued)

OTHER PUBLICATIONS

Sattler, K., et al., "A Data Preparation Framework based on a Multidatabase Language," XP010554384, International Symposium on Database Engineering and Applications, Jul. 16, 2001, 10 pages.
(Continued)

*Primary Examiner* — Ly D Pham
(74) *Attorney, Agent, or Firm* — Conley Rose, P.C.

(57) ABSTRACT

A method and an apparatus for data processing in data modeling, where the method includes performing, according to a data transformation function corresponding to a preset data processing category identifier, data transformation on a data column corresponding to each characteristic in original data in order to generate a corresponding extended characteristic column, combining extended characteristic columns corresponding to all the characteristics in the original data in order to generate an extended characteristic set, determining a correlation coefficient of each characteristic in the extended characteristic set, selecting a characteristic whose correlation coefficient satisfies a specified condition as an important characteristic, and obtaining, by screening from the extended characteristic set, a data column corresponding to the important characteristic. Therefore, problems such as a long consumed time and a large calculation amount caused because data modeling is performed by exhaustively listing data preprocessing methods are avoided, thereby improving calculation efficiency.

20 Claims, 2 Drawing Sheets

(51) Int. Cl.
*G06F 16/583* (2019.01)
*G06F 9/50* (2006.01)
*G06F 16/26* (2019.01)
*G06F 16/2457* (2019.01)
*G06K 9/00* (2006.01)
*G06F 16/2458* (2019.01)
*G06K 9/66* (2006.01)
*G06Q 40/08* (2012.01)

(52) U.S. Cl.
CPC .... *G06F 16/24575* (2019.01); *G06K 9/00288* (2013.01); *G06K 9/66* (2013.01); *G06Q 40/08* (2013.01)

(58) Field of Classification Search
USPC .......................................................... 700/29
See application file for complete search history.

(56) References Cited

FOREIGN PATENT DOCUMENTS

| CN | 102054001 A | 5/2011 |
| CN | 102799682 A | 11/2012 |
| CN | 103559630 A | 2/2014 |

OTHER PUBLICATIONS

Refaat, M., "Data Preparation for Data Mining Using SAS," XP040425746, Referex, Part 1, Sep. 2006, 195 pages.
Refaat, M., "Data Preparation for Data Mining Using SAS," XP040425746, Referex, Part 2, Sep. 2006, 195 pages.
Han, J., et al., "Data Preparation for Data Mining Using SAS," XP055100892, Mar. 2006, 58 pages.
Foreign Communication From a Counterpart Application, European Application No. 15871702.5, Extended European Search Report dated Aug. 24, 2017, 9 pages.
Machine Translation and Abstract of Chinese Publication No. CN101499075, Aug. 5, 2009, 5 pages.
Machine Translation and Abstract of Chinese Publication No. CN101799808, Aug. 11, 2010, 12 pages.
Machine Translation and Abstract of Chinese Publication No. CN102054001, May 11, 2011, 12 pages.
Machine Translation and Abstract of Chinese Publication No. CN102799682, Nov. 28, 2012, 11 pages.
Machine Translation and Abstract of Chinese Publication No. CN103559630, Feb. 5, 2014, 8 pages.
Foreign Communication From a Counterpart Application, PCT Application No. PCT/CN2015/086868, English Translation of International Search Report dated Nov. 2, 2015, 2 pages.
Foreign Communication From a Counterpart Application, PCT Application No. PCT/CN2015/086868, English Translation of Written Opinion dated Nov. 2, 2015, 6 pages.

* cited by examiner

METHOD AND APPARATUS FOR DATA PROCESSING IN DATA MODELING

CROSS-REFERENCE TO RELATED APPLICATIONS

This application is a continuation of International Patent Application No. PCT/CN2015/086868 filed on Aug. 13, 2015, which claims priority to Chinese Patent Application No. 201410814222.7 filed on Dec. 23, 2014. The disclosures of the aforementioned applications are hereby incorporated by reference in their entireties.

TECHNICAL FIELD

The present disclosure relates to the field of computer technologies, and in particular, to a method and an apparatus for data processing in data modeling.

BACKGROUND

Data mining is a step in database knowledge discovery, and is to find a hidden relationship from a large amount of data and extract valuable information. Generally, a database technology, statistics, online analysis processing, and a method and a technology in the field of machine learning are combined in data mining in order to process data from different perspectives.

A specific procedure of data mining includes the steps of service understanding, data understanding, data preparation, model establishment, model evaluation, and model deployment.

In a data preparation process, obtained original data needs to be preprocessed. The original data is flat-wide table data saved in a database or a data warehouse. Referring to Table 1, the original data includes a missing value (for example, the age of Li XX) and an outlier (the age and call duration of Zhang XX), and further includes a continuous value (an age column, a package fee column, a call duration column) and a discrete value (gender, region, whether off-net). Each column in the original data is referred to as one characteristic. In an actual application, different characteristics may be selected as target characteristics according to different training needs.

TABLE 1

Original data table

| User ID | Name | Age | Gender | Region | Package fee | Call duration (minute) | Whether off-net |
|---------|------|-----|--------|--------|-------------|------------------------|-----------------|
| 1651654 | Wang XX | 28 | Female | Guangzhou | 128 | 150 | No |
| 1651655 | Li XX | — | Male | Shenzhen | 328 | 450 | No |
| 1651656 | Zhang XX | 106 | Male | Beijing | 188 | −10 | Yes |
| ... | | | | | | | |

A process of preprocessing a characteristic of the original data includes methods such as missing value filling, outlier processing, continuous value standardization, continuous value discretization, and discrete value combination operation.

In a data preparation process, preprocessing on the original data is a very important step in a data mining procedure and a data modeling procedure. By means of preprocessing, the original data may be transformed into a training data set suitable for a data modeling algorithm, and more importantly, a result of preprocessing directly affects effects of data mining and data modeling. However, in conventional data mining, data preparation is usually performed by an expert in the field of data mining. The data preparation not only has a high requirement on model-establishment personnel, but also needs manual participation in a preprocessing process. Therefore, efficiency is relatively low, a long time is consumed, and a data preprocessing procedure cannot be reused.

Currently, preprocessing is usually performed on the original data by means of grid searching. When data preprocessing is performed by means of grid searching, all preprocessing methods and parameter configuration of each method need to be set. For example, continuous value discretization includes methods such as equi-width binning, equi-depth binning, and equi-frequency binning. A parameter of the equi-width binning method may be 10, 50, 100, or the like. A series of grids are divided into according to different preprocessing methods and different parameters. Each grid corresponds to one combination of the preprocessing methods, which is referred to as one preprocessing solution. Points in each grid are calculated in sequence. A data result output after each time of calculation is used as training data, to perform model training. After the training, an effect of a model is assessed in order to generate an assessment indicator corresponding to each grid. A result corresponding to a grid that has an optimal assessment indicator and is obtained by means of screening is used as a final result.

All feasible preprocessing solutions need to be exhaustively listed when grid searching is used, and modeling is performed for a preprocessing result of each solution in order to obtain a final data preprocessing solution. Obviously, there are many methods for preprocessing the original data, and the methods may correspond to different parameter values. Therefore, there are relatively many preprocessing solutions generated by means of combination, complexity is in an exponential relationship with a quantity, and a calculation amount is large. In addition, when each preprocessing solution is assessed, a complete data modeling procedure needs to be performed. A data modeling procedure calculation time is long, and the calculation amount of repeated modeling is large. Consequently, operating load of a computer is increased, a computing resource is wasted, and work efficiency of the computer is reduced.

SUMMARY

Embodiments of the present disclosure provide a method and an apparatus for data processing in data modeling in order to resolve problems in the other approaches that in an original data preprocessing procedure, a calculation time is long, a calculation amount is large, computer operation load is increased, a computing resource is wasted, and work efficiency of a computer is decreased.

Specific technical solutions provided in the embodiments of the present disclosure are as follows.

According to a first aspect, a method for data processing in data modeling is provided, including reading original data and preset multiple data processing category identifiers, where each data column in the original data corresponds to one characteristic, performing, according to a data transformation function corresponding to each data processing category identifier, data transformation on a data column corresponding to each characteristic in the original data in order to generate a corresponding extended characteristic column, and combining extended characteristic columns corresponding to all the characteristics in the original data in order to generate an extended characteristic set, determining a correlation coefficient of each characteristic in the extended characteristic set, selecting a characteristic whose correlation coefficient satisfies a specified condition as an important characteristic, and obtaining, by means of screening from the extended characteristic set, a data column corresponding to the important characteristic.

With reference to the first aspect, in a first possible implementation manner, performing data transformation on a data column corresponding to any characteristic in the original data in order to generate a corresponding extended characteristic column includes obtaining, by means of screening from the multiple data processing category identifiers according to the data column corresponding to the characteristic, a target data processing category identifier corresponding to the characteristic, performing, according to a data transformation function corresponding to each target data processing category identifier obtained by means of screening, data transformation on the data column corresponding to the characteristic in order to generate an extended characteristic corresponding to the target data processing category identifier, and setting all the extended characteristics corresponding to the target data processing category identifiers as the extended characteristic column of the characteristic.

With reference to the first possible implementation manner of the first aspect, in a second possible implementation manner, obtaining, by means of screening from the multiple data processing category identifiers according to the data column corresponding to the characteristic, a target data processing category identifier corresponding to the characteristic includes determining a data type of the characteristic according to the data column corresponding to the characteristic, and obtaining, by means of screening from the multiple data processing category identifiers, a target data processing category identifier corresponding to the data type, where the data type includes a discrete type and a continuous type, and/or determining a data defect type of the characteristic according to the data column corresponding to the characteristic, and obtaining, by means of screening from the multiple data processing category identifiers, a target data processing category identifier corresponding to the data defect type, where the data defect type includes a missing value and an outlier.

With reference to the first aspect or either of the foregoing possible implementation manners of the first aspect, in a third possible implementation manner, combining extended characteristic columns corresponding to all the characteristics in the original data in order to generate an extended characteristic set includes combining the extended characteristic columns corresponding to all the characteristics in the original data, and performing one-hot encoding on each data column in the combined extended characteristic columns in order to generate the extended characteristic set.

With reference to the third possible implementation manner of the first aspect, in a fourth possible implementation manner, after performing one-hot encoding on each data column in the combined extended characteristic columns in order to generate the extended characteristic set, the method further includes performing logic AND operation on any two data columns in the extended characteristic set in order to obtain a new data column, and adding the new data column to the extended characteristic set.

With reference to the first aspect or any one of the foregoing possible implementation manners of the first aspect, in a fifth possible implementation manner, determining a correlation coefficient of each characteristic in the extended characteristic set includes obtaining a target regularization coefficient, and performing logistic regression training on the extended characteristic set based on the target regularization coefficient in order to obtain a corresponding target logistic regression function, and determining the correlation coefficient of each characteristic in the extended characteristic set according to the target logistic regression function.

With reference to the fifth possible implementation manner of the first aspect, in a sixth possible implementation manner, obtaining a target regularization coefficient includes obtaining a preset target regularization coefficient, or obtaining preset multiple regularization coefficients, and obtaining the target regularization coefficient by means of screening from the preset multiple regularization coefficients based on the extended characteristic set.

With reference to the sixth possible implementation manner of the first aspect, in a seventh possible implementation manner, obtaining the target regularization coefficient by means of screening from the preset multiple regularization coefficients based on the extended characteristic set includes performing logistic regression training on the extended characteristic set according to each regularization coefficient in the preset multiple regularization coefficients in order to obtain a corresponding logistic regression function, and determining the target regularization coefficient according to the logistic regression function corresponding to each regularization coefficient, or performing a linear support vector machine operation on the extended characteristic set according to each regularization coefficient in the preset multiple regularization coefficients in order to obtain a corresponding support vector function, and determining the target regularization coefficient according to the support vector function corresponding to each regularization coefficient.

With reference to the seventh possible implementation manner of the first aspect, in an eighth possible implementation manner, performing logistic regression training on the extended characteristic set according to each regularization coefficient in the preset multiple regularization coefficients in order to obtain a corresponding logistic regression function includes performing sampling on the extended characteristic set according to a specified ratio in order to obtain a training set, and performing logistic regression training on the training set according to each regularization coefficient in the preset multiple regularization coefficients in order to obtain the corresponding logistic regression function.

With reference to the eighth possible implementation manner of the first aspect, in a ninth possible implementation manner, determining the target regularization coefficient according to the logistic regression function corresponding to each regularization coefficient includes using data in the extended characteristic set except the training set as a validation set, determining a target characteristic in all characteristics in the validation set, calculating an accuracy coefficient of the logistic regression function corresponding to each regularization coefficient with respect to the target characteristic in the validation set, and obtaining, by means of screening, a logistic regression function corresponding to a highest accuracy coefficient, and using a regularization coefficient corresponding to the logistic regression function obtained by means of screening as the target regularization coefficient.

With reference to the ninth possible implementation manner of the first aspect, in a tenth possible implementation manner, when the target characteristic is a classification characteristic, the accuracy coefficient is any one of an accuracy rate, a recall rate, an F value, or an area under receiver operating characteristic (roc) curve (AUC), and the accuracy coefficient is a reciprocal of a quadratic sum of a mean error when the target characteristic is a continuous characteristic.

With reference to any one of the fifth to the tenth possible implementation manners of the first aspect, in an eleventh possible implementation manner, determining the correlation coefficient of each characteristic in the extended characteristic set according to the target logistic regression function includes using a weight corresponding to each characteristic in the target logistic regression function as the correlation coefficient corresponding to the characteristic.

With reference to the first aspect or any one of the foregoing possible implementation manners of the first aspect, in a twelfth possible implementation manner, selecting a characteristic whose correlation coefficient satisfies a specified condition as an important characteristic includes selecting a characteristic whose correlation coefficient is greater than a specified correlation coefficient threshold as the important characteristic, or sorting the characteristics in descending order according to the correlation coefficients, and selecting a specified quantity of top-ranked characteristics as the important characteristics.

According to a second aspect, an apparatus for data processing in data modeling is provided, including a reading unit configured to read original data and preset multiple data processing category identifiers, where each data column in the original data corresponds to one characteristic, a processing unit configured to perform, according to a data transformation function corresponding to each processing category identifier, data transformation on a data column corresponding to each characteristic in the original data in order to generate a corresponding extended characteristic column, and combine extended characteristic columns corresponding to all the characteristics in the original data in order to generate an extended characteristic set, a determining unit configured to determine a correlation coefficient of each characteristic in the extended characteristic set, a first selection unit configured to select a characteristic whose correlation coefficient satisfies a specified condition as an important characteristic, and a second selection unit configured to obtain, by means of screening from the extended characteristic set, a data column corresponding to the important characteristic.

With reference to the second aspect, in a first possible implementation manner, when performing data transformation on the data column corresponding to any characteristic in the original data in order to generate the corresponding extended characteristic column, the processing unit is further configured to obtain, by means of screening from the multiple data processing category identifiers according to the data column corresponding to the characteristic, a target data processing category identifier corresponding to the characteristic, perform, according to a data transformation function corresponding to each target data processing category identifier obtained by means of screening, data transformation on the data column corresponding to the characteristic in order to generate an extended characteristic corresponding to the target data processing category identifier, and use all the extended characteristics corresponding to the target data processing category identifiers as the extended characteristic column of the characteristic.

With reference to the first possible implementation manner of the second aspect, in a second possible implementation manner, when obtaining, by means of screening from the multiple data processing category identifiers according to the data column corresponding to the characteristic, the target data processing category identifier corresponding to the characteristic, the processing unit is further configured to determine a data type of the characteristic according to the data column corresponding to the characteristic, and obtain, by means of screening from the multiple data processing category identifiers, a target data processing category identifier corresponding to the data type, where the data type includes a discrete type and a continuous type, and/or determine a data defect type of the characteristic according to the data column corresponding to the characteristic, and obtain, by means of screening from the multiple data processing category identifiers, a target data processing category identifier corresponding to the data defect type, where the data defect type includes a missing value and an outlier.

With reference to the second aspect or either of the foregoing possible implementation manners of the second aspect, in a third possible implementation manner, when combining the extended characteristic columns corresponding to all the characteristics in the original data in order to generate the extended characteristic set, the processing unit is further configured to combine the extended characteristic columns corresponding to all the characteristics in the original data, and perform one-hot encoding on each data column in the combined extended characteristic columns in order to generate the extended characteristic set.

With reference to the third possible implementation manner of the second aspect, in a fourth possible implementation manner, after performing one-hot encoding on each data column in the combined extended characteristic columns in order to generate the extended characteristic set, the processing unit is further configured to perform logic AND operation on any two data columns in the extended characteristic set in order to obtain a new data column, and add the new data column to the extended characteristic set.

With reference to the second aspect or any one of the foregoing possible implementation manners of the second aspect, in a fifth possible implementation manner, the determining unit is further configured to obtain a target regularization coefficient, and perform logistic regression training on the extended characteristic set based on the target regularization coefficient in order to obtain a corresponding target logistic regression function, and determine the correlation coefficient of each characteristic in the extended characteristic set according to the target logistic regression function.

With reference to the fifth possible implementation manner of the second aspect, in a sixth possible implementation manner, when obtaining the target regularization coefficient, the determining unit is further configured to obtain a preset target regularization coefficient, or obtain preset multiple regularization coefficients, and obtain the target regularization coefficient by means of screening from the preset multiple regularization coefficients based on the extended characteristic set.

With reference to the sixth possible implementation manner of the second aspect, in a seventh possible implementation manner, when obtaining the target regularization coefficient by means of screening from the preset multiple regularization coefficients based on the extended characteristic set, the determining unit is further configured to perform logistic regression training on the extended characteristic set according to each regularization coefficient in the preset multiple regularization coefficients in order to obtain a corresponding logistic regression function, and determine the target regularization coefficient according to the logistic regression function corresponding to each regularization coefficient, or perform a linear support vector machine operation on the extended characteristic set according to each regularization coefficient in the preset multiple regularization coefficients in order to obtain a corresponding support vector function, and determine the target regularization coefficient according to the support vector function corresponding to each regularization coefficient.

With reference to the seventh possible implementation manner of the second aspect, in an eighth possible implementation manner, when performing logistic regression training on the extended characteristic set according to each regularization coefficient in the preset multiple regularization coefficients in order to obtain the corresponding logistic regression function, the determining unit is further configured to perform sampling on the extended characteristic set according to a specified ratio in order to obtain a training set, and perform logistic regression training on the training set according to each regularization coefficient in the preset multiple regularization coefficients in order to obtain the corresponding logistic regression function.

With reference to the eighth possible implementation manner of the second aspect, in a ninth possible implementation manner, when determining the target regularization coefficient according to the logistic regression function corresponding to each regularization coefficient, the determining unit is further configured to use data in the extended characteristic set except the training set as a validation set, determine a target characteristic in all characteristics in the validation set, calculate an accuracy coefficient of the logistic regression function corresponding to each regularization coefficient with respect to the target characteristic in the validation set, and obtain, by means of screening, a logistic regression function corresponding to a highest accuracy coefficient, and use a regularization coefficient corresponding to the logistic regression function obtained by means of screening as the target regularization coefficient.

With reference to the ninth possible implementation manner of the second aspect, in a tenth possible implementation manner, when the target characteristic is a classification characteristic, the accuracy coefficient is any one of the following an accuracy rate, a recall rate, an F value, or an AUC, and the accuracy coefficient is a reciprocal of a quadratic sum of a mean error when the target characteristic is a continuous characteristic.

With reference to any one of the fifth to the tenth possible implementation manners of the second aspect, in an eleventh possible implementation manner, when determining the correlation coefficient of each characteristic in the extended characteristic set according to the target logistic regression function, the determining unit is further configured to use a weight corresponding to each characteristic in the target logistic regression function as the correlation coefficient corresponding to the characteristic.

With reference to the second aspect or any one of the foregoing possible implementation manners of the second aspect, in a twelfth possible implementation manner, the first selection unit is further configured to select a characteristic whose correlation coefficient is greater than a specified correlation coefficient threshold as the important characteristic, or sort the characteristics in descending order according to the correlation coefficients, and select a specified quantity of top-ranked characteristics as the important characteristics.

By means of the technical solutions of the present disclosure, data transformation is performed on a data column corresponding to each characteristic in read original data according to a data transformation function corresponding to a preset data processing category identifier in order to generate a corresponding extended characteristic column, and extended characteristic columns corresponding to all the characteristics in the original data are combined in order to generate an extended characteristic set, a correlation coefficient of each characteristic in the extended characteristic set is determined, a characteristic whose correlation coefficient satisfies a specified condition is selected as an important characteristic, and a data column corresponding to the important characteristic is obtained by means of screening from the extended characteristic set. A calculation amount of assessing multiple data preprocessing methods is decreased in a manner of extending a characteristic, thereby avoiding problems of a long consumed time and a large calculation amount that are caused because data modeling is performed by exhaustively listing data preprocessing methods, and improving calculation efficiency. The important characteristic is selected by sorting correlation coefficients such that a quantity of characteristics may be controlled, which reduces a quantity of input data during data modeling and a calculation amount of a computer. In addition, a data preprocessing result adapts to multiple data modeling algorithms, thereby improving flexibility and adaptability of automatic data modeling.

DESCRIPTION OF EMBODIMENTS

By means of a method for data processing in data modeling provided in the present disclosure, data transformation is performed on a data column corresponding to each characteristic in read original data according to a data transformation function corresponding to a preset data processing category identifier in order to generate a corresponding extended characteristic column, and extended characteristic columns corresponding to all the characteristics in the original data are combined in order to generate an extended characteristic set, a correlation coefficient of each characteristic in the extended characteristic set is determined, a characteristic whose correlation coefficient satisfies a specified condition is selected as an important characteristic, and a data column corresponding to the important characteristic is obtained by means of screening from the extended characteristic set. A calculation amount of assessing multiple data preprocessing methods is decreased in a manner of extending a characteristic, thereby avoiding problems of a long consumed time and a large calculation amount that are caused because data modeling is performed by exhaustively listing data preprocessing methods, and improving calculation efficiency. The important characteristic is selected by sorting correlation coefficients such that a quantity of characteristics may be controlled, which reduces a quantity of input data during data modeling and a calculation amount of a computer. In addition, a data preprocessing result adapts to multiple data modeling algorithms, thereby improving flexibility and adaptability of automatic data modeling.

Embodiments of the present disclosure provide a method for data processing in data modeling, applied to various terminal devices implementing data modeling and data mining, such as a computer and a server. Exemplary implementation manners of the present disclosure are described in detail below with reference to accompanying drawings.

Figure 1:
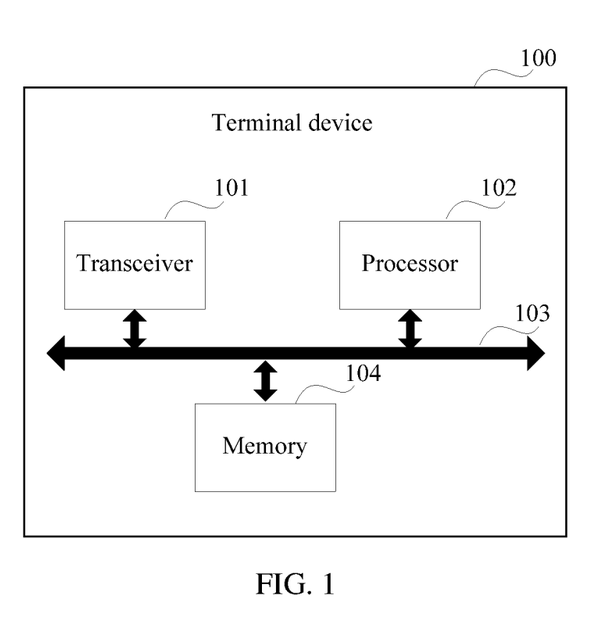
FIG. 1 is a schematic structural diagram of a terminal device according to an embodiment of the present disclosure.

An embodiment of the present disclosure provides a terminal device 100 implementing the method for data processing in data modeling. The terminal device 100 is a device such as a computer installed with various applications. Referring to FIG. 1, the terminal device 100 includes a transceiver 101, a processor 102, a bus 103, and a memory 104.

The transceiver 101, the processor 102, and the memory 104 are connected to each other using the bus 103. The bus 103 may be a peripheral component interconnect (PCT) bus, an extended industry standard architecture (EISA) bus, or the like. The bus 103 may be classified into an address bus, a data bus, a control bus, and the like. For ease of representation, the bus 103 in FIG. 1 is represented using only one bold line, but it does not indicate that there is only one bus or only one type of bus.

The transceiver 101 is configured to obtain original data, and output a data column corresponding to an important characteristic, that is, a final result obtained by means of data processing.

Figure 2:
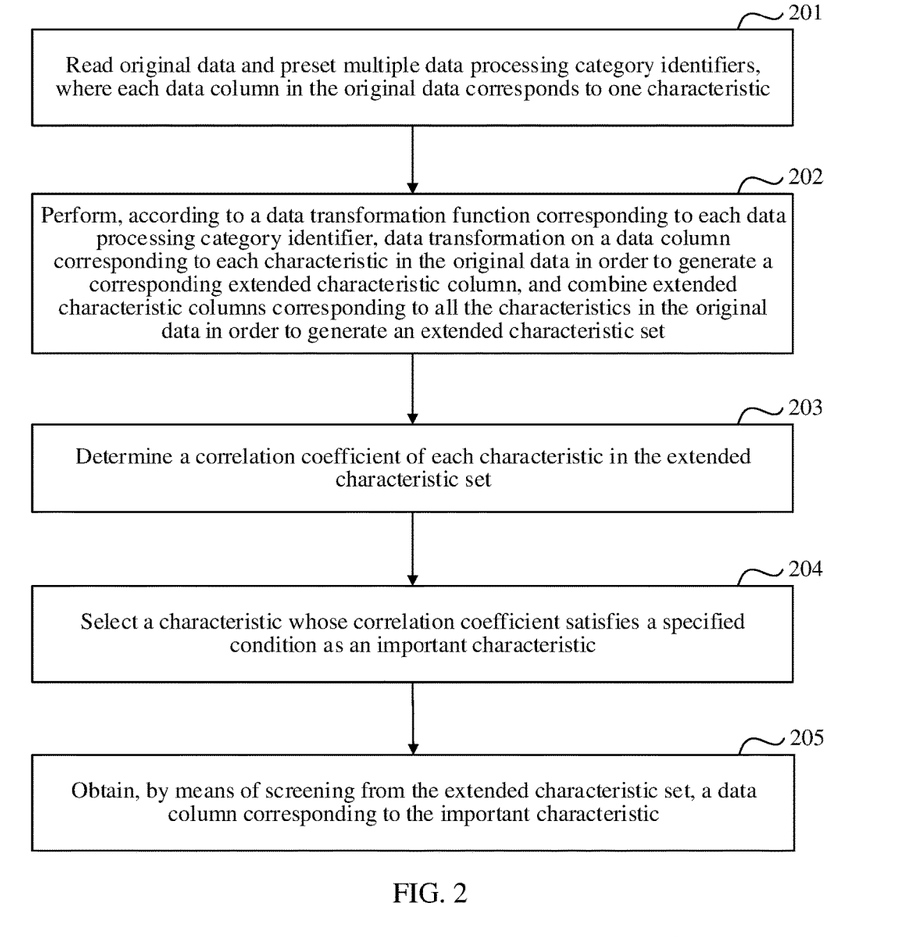
FIG. 2 is a specific flowchart of a method for data processing in data modeling according to an embodiment of the present disclosure.

The processor 102 is configured to implement a method for data processing in data modeling shown in FIG. 2 of the embodiments of the present disclosure, where the method includes reading original data and preset multiple data processing category identifiers, where each data column in the original data corresponds to one characteristic, performing, according to a data transformation function corresponding to each data processing category identifier, data transformation on a data column corresponding to each characteristic in the original data in order to generate a corresponding extended characteristic column, and combining extended characteristic columns corresponding to all the characteristics in the original data in order to generate an extended characteristic set, determining a correlation coefficient of each characteristic in the extended characteristic set, selecting a characteristic whose correlation coefficient satisfies a specified condition as an important characteristic, and obtaining, by means of screening from the extended characteristic set, a data column corresponding to the important characteristic.

Optionally, performing data transformation on a data column corresponding to any characteristic in the original data in order to generate a corresponding extended characteristic column includes obtaining, by means of screening from the multiple data processing category identifiers according to the data column corresponding to the characteristic, a target data processing category identifier corresponding to the characteristic, performing, according to a data transformation function corresponding to each target data processing category identifier obtained by means of screening, data transformation on the data column corresponding to the characteristic in order to generate an extended characteristic corresponding to the target data processing category identifier, and using all extended characteristics corresponding to the target data processing category identifiers as the extended characteristic column of the characteristic.

Optionally, obtaining, by means of screening from the multiple data processing category identifiers according to the data column corresponding to the characteristic, a target data processing category identifier corresponding to the characteristic includes determining a data type of the characteristic according to the data column corresponding to the characteristic, and obtaining, by means of screening from the multiple data processing category identifiers, a target data processing category identifier corresponding to the data type, where the data type includes a discrete type and a continuous type, and/or determining a data defect type of the characteristic according to the data column corresponding to the characteristic, and obtaining, by means of screening from the multiple data processing category identifiers, a target data processing category identifier corresponding to the data defect type, where the data defect type includes a missing value and an outlier.

Optionally, combining extended characteristic columns corresponding to all the characteristics in the original data in order to generate an extended characteristic set includes combining the extended characteristic columns corresponding to all the characteristics in the original data, and performing one-hot encoding on each data column in the combined extended characteristic columns in order to generate the extended characteristic set.

Optionally, after performing one-hot encoding on each data column in the combined extended characteristic columns in order to generate the extended characteristic set, the method further includes performing logic AND operation on any two data columns in the extended characteristic set in order to obtain a new data column, and adding the new data column to the extended characteristic set.

Optionally, determining a correlation coefficient of each characteristic in the extended characteristic set includes obtaining a target regularization coefficient, and performing logistic regression training on the extended characteristic set based on the target regularization coefficient in order to obtain a corresponding target logistic regression function, and determining the correlation coefficient of each characteristic in the extended characteristic set according to the target logistic regression function.

Optionally, obtaining a target regularization coefficient includes obtaining a preset target regularization coefficient, or obtaining preset multiple regularization coefficients, and obtaining the target regularization coefficient by means of screening from the preset multiple regularization coefficients based on the extended characteristic set.

Optionally, obtaining the target regularization coefficient by means of screening from the preset multiple regularization coefficients based on the extended characteristic set includes performing logistic regression training on the extended characteristic set according to each regularization coefficient in the preset multiple regularization coefficients in order to obtain a corresponding logistic regression function, and determining the target regularization coefficient according to the logistic regression function corresponding to each regularization coefficient, or performing a linear support vector machine operation on the extended characteristic set according to each regularization coefficient in the preset multiple regularization coefficients in order to obtain a corresponding support vector function, and determining the target regularization coefficient according to the support vector function corresponding to each regularization coefficient.

Optionally, performing logistic regression training on the extended characteristic set according to each regularization coefficient in the preset multiple regularization coefficients in order to obtain a corresponding logistic regression function includes performing sampling on the extended characteristic set according to a specified ratio in order to obtain a training set, and performing logistic regression training on the training set according to each regularization coefficient in the preset multiple regularization coefficients in order to obtain the corresponding logistic regression function.

Optionally, determining the target regularization coefficient according to the logistic regression function corresponding to each regularization coefficient includes using data in the extended characteristic set except the training set as a validation set, determining a target characteristic in all characteristics in the validation set, calculating an accuracy coefficient of the logistic regression function corresponding to each regularization coefficient with respect to the target characteristic in the validation set, and obtaining, by means of screening, a logistic regression function corresponding to a highest accuracy coefficient, and using a regularization coefficient corresponding to the logistic regression function obtained by means of screening as the target regularization coefficient.

Optionally, when the target characteristic is a classification characteristic, the accuracy coefficient is any one of the following an accuracy rate, a recall rate, an F value, or an AUC, and the accuracy coefficient is a reciprocal of a quadratic sum of a mean error when the target characteristic is a continuous characteristic.

Optionally, determining the correlation coefficient of each characteristic in the extended characteristic set according to the target logistic regression function includes using a weight corresponding to each characteristic in the target logistic regression function as the correlation coefficient corresponding to the characteristic.

Optionally, selecting a characteristic whose correlation coefficient satisfies a specified condition as an important characteristic includes selecting a characteristic whose correlation coefficient is greater than a specified correlation coefficient threshold as the important characteristic, or sorting characteristics in descending order according to the correlation coefficients, and selecting a specified quantity of top-ranked characteristics as the important characteristics.

The terminal device 100 further includes a memory 104 configured to store a program, a data processing category identifier, a corresponding data transformation function, original data, an extended characteristic set that is generated according to the original data, and the like. The program may include program code, where the program code includes a computer operation instruction. The memory 104 may include a random access memory (RAM), and may further include a non-volatile memory, for example, at least one magnetic disk storage. The processor 102 executes the application program stored in the memory 104 in order to implement the foregoing method for data processing in data modeling.

Referring to FIG. 2, a specific processing procedure of a method for data processing in data modeling provided in an embodiment of the present disclosure includes the following steps.

Step 201: Read original data and preset multiple data processing category identifiers, where each data column in the original data corresponds to one characteristic.

The original data may be read from a local database or a local data warehouse, or the original data may be directly read from a server or another storage device when step 201 is performed. The original data is flat-wide table data in Table 1, and each data column corresponds to one characteristic.

The preset multiple data processing category identifiers are saved in a preprocessing method knowledge base. Each data processing category identifier corresponds to one transformation function, that is, a preprocessing method including a specific parameter, for example, equi-width binning whose parameter is 10, or equi-width binning whose parameter is 50, or missing value filling being affinity filling.

Step 202: Perform, according to a data transformation function corresponding to each data processing category identifier, data transformation on a data column corresponding to each characteristic in the original data in order to generate a corresponding extended characteristic column, and combine extended characteristic columns corresponding to all the characteristics in the original data in order to generate an extended characteristic set.

Performing data transformation on a data column corresponding to any characteristic in the original data in order to generate a corresponding extended characteristic column includes obtaining, by means of screening from the multiple data processing category identifiers according to the data column corresponding to the characteristic, a target data processing category identifier corresponding to the characteristic, performing, according to a data transformation function corresponding to each target data processing category identifier obtained by means of screening, data transformation on the data column corresponding to the characteristic in order to generate an extended characteristic corresponding to the target data processing category identifier, and using all the extended characteristics corresponding to the target data processing category identifiers as the extended characteristic column of the characteristic.

Obtaining, by means of screening from the multiple data processing category identifiers according to the data column corresponding to the characteristic, a target data processing category identifier corresponding to the characteristic includes determining a data type of the characteristic according to the data column corresponding to the characteristic, and obtaining, by means of screening from the multiple data processing category identifiers, a target data processing category identifier corresponding to the data type, where the data type includes a discrete type and a continuous type, and/or determining a data defect type of the characteristic according to the data column corresponding to the characteristic, and obtaining, by means of screening from the multiple data processing category identifiers, a target data processing category identifier corresponding to the data defect type, where the data defect type includes a missing value and an outlier.

For example, if data corresponding to the characteristic, that is, income, is a continuous value, and there is a missing value in the characteristic, it is determined, according to the data type of the characteristic, that the corresponding target data processing category identifier includes equi-width binning whose parameter is 10, 50, and 100, and equi-depth binning whose parameter is 50 and 100 in continuous value standardization, and further includes affinity filling and mode filling that are of missing value filling. Therefore, there are seven target data processing category identifiers corresponding to the characteristic.

Data corresponding to the characteristic is transformed according to the determined data transformation function corresponding to each target data processing category identifier in order to generate a corresponding extended characteristic. Quantities of data columns that correspond to the extended characteristics are different. For example, an extended characteristic corresponding to the affinity filling and the mode filling is one data column, and for equi-width binning and equi-depth binning, quantities of generated data columns are different according to different quantities of divided bins.

All the extended characteristics corresponding to the target data processing category identifiers are used as the extended characteristic column of the characteristic. Therefore, the characteristic in the original data is a data column, and is transformed into seven different extended characteristics according to seven transformation functions, and the seven extended characteristics are referred to as the extended characteristic column of the characteristic.

Data transformation is performed on data corresponding to each characteristic in the original data in order to generate a corresponding extended characteristic column. These extended characteristic columns are combined into an extended characteristic set.

Further, combining extended characteristic columns corresponding to all the characteristics in the original data in order to generate an extended characteristic set includes combining the extended characteristic columns corresponding to all the characteristics in the original data, and performing one-hot encoding on each data column in the combined extended characteristic columns in order to generate the extended characteristic set.

One-hot encoding is performed on each data column in the combined extended characteristic columns, and a value of each piece of data changes into 0 or 1 such that a data value of the generated extended characteristic set is simplified, thereby increasing a processing speed of the extended characteristic set.

After the extended characteristic set is obtained, the method further includes performing logic AND operation on any two data columns in the extended characteristic set in order to obtain a new data column, and adding the new data column to the extended characteristic set.

Logic AND operation is performed on two data columns obtained after one-hot encoding in order to obtain a higher-order extended characteristic, and then the higher-order extended characteristic is added to the extended characteristic set. In this way, correlation of two characteristics can be accurately calculated.

Step 203: Determine a correlation coefficient of each characteristic in the extended characteristic set.

Furthermore, the step 203 includes the following steps obtaining a target regularization coefficient, and performing logistic regression training on the extended characteristic set in order to obtain a corresponding target logistic regression function, and determining the correlation coefficient of each characteristic in the extended characteristic set according to the target logistic regression function.

The target regularization coefficient is obtained in the following two manners. A first manner includes obtaining a preset target regularization coefficient, and a second manner includes obtaining preset multiple regularization coefficients, and obtaining the target regularization coefficient by means of screening from the preset multiple regularization coefficients based on the extended characteristic set.

In the second manner, the target regularization coefficient is obtained by means of screening from the preset multiple regularization coefficients based on the extended characteristic set using two methods. A first method includes performing logistic regression training on the extended characteristic set according to each regularization coefficient in the preset multiple regularization coefficients in order to obtain a corresponding logistic regression function, and determining the target regularization coefficient according to the logistic regression function corresponding to each regularization coefficient, and a second method includes performing a linear support vector machine operation on the extended characteristic set according to each regularization coefficient in the preset multiple regularization coefficients in order to obtain a corresponding support vector function, and determining the target regularization coefficient according to the support vector function corresponding to each regularization coefficient.

In the first method, performing logistic regression training on the extended characteristic set according to each regularization coefficient in the preset multiple regularization coefficients in order to obtain a corresponding logistic regression function includes performing sampling on the extended characteristic set according to a specified ratio in order to obtain a training set, and performing logistic regression training on the training set according to each regularization coefficient in the preset multiple regularization coefficients in order to obtain the corresponding logistic regression function.

Random sampling is performed on the extended characteristic set in rows. The extended characteristic set is divided into a training set and a validation set according to a ratio, for example, the common ratio is 70:30 or 80:20, which is not limited in this embodiment of the present disclosure. One of the preset multiple regularization coefficients is selected, for example, 0.01, 0.05, 0.1, or 0.2. Using the training set as an input sample, logistic regression training of an L1 norm or an L2 norm is performed for each lambda. A quantity of iteration times or a convergence fault range is specified, and random gradient descent logistic regression iterative calculation is performed. Iteration is stopped when the quantity of iteration times or the convergence fault range is reached in order to obtain a trained logistic regression function.

The logistic regression function obtained after logistic regression training may be, for example, f(x)=0.5*"ages from 20 to 30"+0.35*"gender being male"+0.45*"region being Beijing" . . . .

Determining the target regularization coefficient according to the logistic regression function corresponding to each regularization coefficient includes using data in the extended characteristic set except the training set as a validation set, determining a target characteristic in all characteristics in the validation set, calculating an accuracy coefficient of the logistic regression function corresponding to each regularization coefficient with respect to the target characteristic in the validation set, and obtaining, by means of screening, a logistic regression function corresponding to a highest accuracy coefficient, and using a regularization coefficient corresponding to the logistic regression function obtained by means of screening as the target regularization coefficient.

In the second method, similar to the first method, the performing a linear support vector machine operation on the extended characteristic set according to each regularization coefficient in the preset multiple regularization coefficients in order to obtain a corresponding support vector function includes performing sampling on the extended characteristic set according to a specified ratio in order to obtain a training set, and performing the linear support vector machine operation on the training set according to each regularization coefficient in the preset multiple regularization coefficients in order to obtain the corresponding support vector function.

Determining the target regularization coefficient according to the support vector function corresponding to each regularization coefficient includes using data in the extended characteristic set except the training set as a validation set, determining a target characteristic in all characteristics in the validation set, calculating an accuracy coefficient of the support vector function corresponding to each regularization coefficient with respect to the target characteristic in the validation set, and obtaining, by means of screening, a support vector function corresponding to a highest accuracy coefficient, and using the regularization coefficient corresponding to the support vector function obtained by means of screening as the target regularization coefficient.

A structure of the support vector function obtained in the second method is the same as that of the logistic regression function in the first method, and the structure is in the form of f(x)=0.5*"ages from 20 to 30"+0.35*"gender being male"+0.45*"region being Beijing" . . . .

When the target characteristic is a classification characteristic, the accuracy coefficient is any one of an accuracy rate, a recall rate, an F value, or an AUC, and the accuracy coefficient is a reciprocal of a quadratic sum of a mean error when the target characteristic is a continuous characteristic.

After the target characteristic is determined as the classification characteristic, data in each row in the validation set except data corresponding to the target characteristic is substituted in the logistic regression function in order to verify whether an obtained result is the same as the data corresponding to the target characteristic. The accuracy rate is a ratio of a quantity of rows that have a same result to a total quantity of rows of the validation set.

When the target characteristic is determined as the continuous characteristic, similarly, the data in each row in the validation set except the data corresponding to the target characteristic is substituted in the logistic regression function in order to calculate a quadratic sum of a mean error between the result obtained through verification and the data corresponding to the target characteristic. The reciprocal of the quadratic sum of the mean error is used as the accuracy coefficient.

Determining the correlation coefficient of each characteristic in the extended characteristic set according to the target logistic regression function includes using a weight corresponding to each characteristic in the target logistic regression function as the correlation coefficient corresponding to the characteristic.

Step 204: Select a characteristic whose correlation coefficient satisfies a specified condition as an important characteristic.

The step 204 is performed in two manners. A first manner includes selecting a characteristic whose correlation coefficient is greater than a specified correlation coefficient threshold as the important characteristic, and a second manner includes sorting characteristics in descending order according to the correlation coefficients, and selecting a specified quantity of top-ranked characteristics as the important characteristics.

Step 205: Obtain, by means of screening from the extended characteristic set, a data column corresponding to the important characteristic.

The previously-generated extended characteristic set is filtered based on the selected important characteristic, only the data column corresponding to the important characteristic is obtained by means of screening and is used as a preprocessing result, and then data modeling is performed on the preprocessing result.

Modeling is performed, according to a data mining procedure, on data on which automatic preprocessing has been performed. Multiple algorithms may be selected, for example, a decision tree, naive Bayes, a neural network, and logistic regression. A generated model is assessed, a statistics amount is calculated, a statistics assessment of the model is given, and finally, a final model is output and is used as a calculation model of model deployment.

In the method for data processing in data modeling provided in this embodiment of the present disclosure, a preset preprocessing method knowledge base stores all preprocessing methods for preprocessing a characteristic of the original data. All the preprocessing methods include various preprocessing methods such as missing value filling, outlier processing, continuous value standardization, continuous value discretization, and discrete value combination. Each method corresponds to multiple parameter values, and the method corresponds to multiple data processing category identifiers or multiple transformation functions.

The missing value filling generally includes methods such as affinity filling, median filling, and mode filling. For example, filling on data in which an age and an occupation of a user are known, but income is missing includes affinity filling, where income of persons having a same occupation and similar ages is averaged, and the average income is used as income of the user, median filling, where income of all other users is averaged, and the average income is used as the income of the user, and mode filling, where an income value that appears most often among the income of all persons is used as the income of the user.

In outlier processing, an outlier is usually discarded or changed, then missing value filling is performed, and a filling method is as above, and details are not described herein again.

Continuous value standardization is a method for transforming a data value of a continuous type, and an objective is to set value ranges of all values to a uniform specified range. A common continuous value standardization method includes a standard fraction (value Z) and a min-max method. A calculation equation of the standard fraction is z=(x−an average value)/a standard deviation, and an average value of a value obtained after transformation is 0. A calculation equation of the min-max method is x−min/(max−min), and a value range of the value obtained after transformation is [0, 1].

Continuous value discretization is transforming a value into a series of discrete value ranges, and an objective is to reduce a quantity of values in order to reduce a calculation amount and improve correlation of close values. A common discretization method includes methods such as equi-width binning, equi-depth binning, and equi-frequency binning. For example, assuming that income of a user is a variable whose value range is [0, 100000], there may be 10000 different values for all users. To decrease calculation complexity, income of the users is usually discretized, and is divided into 10 to 100 bins (value ranges) in order to decrease the calculation complexity, and then the income is calculated. In equi-width binning, each bin (an interval) has a same value. For example, if [0, 100000] is divided into 100 bins, the first bin is [0, 1000), the second bin is [1000, 2000), and the so on. A value of each bin is 100000/100=1000. If [0, 100000] is divided into 50 bins, the first bin is [0, 2000), and the second bin is [2000, 4000). In equi-depth binning, quantities of values in bins are equal. For example, 100 bins are specified, and binning is performed in ascending order such that there are 100 values in the first bin, there are also 100 values in the second bin, and so on. The equi-frequency binning is similar to the equi-depth binning, but a quantity of values in each bin is specified rather than a quantity of bins. For example, if there are 200 values in each bin, 50 bins are finally generated. Obviously, different continuous values have different discretization effects. Therefore, selecting an optimal method from multiple binning manners and multiple parameter preprocessing methods of different parameters is an important problem that needs to be resolved in a data preparation stage.

By means of discrete value combination, many discrete values may be combined, and an objective is to reduce a quantity of values in order to reduce a calculation amount and improve correlation of close values. A common combination method includes methods such as knowledge-based combination and frequency-based combination. For the knowledge-based combination, for example, assuming that a city is used as a unit for a region of a user, such as Guangzhou and Shenzhen, cities belong to Guangdong province are combined based on existing Chinese geographic knowledge in order to generate a variable using a province as a unit. For the frequency-based combination, discrete values having similar frequencies may be combined according to frequencies at which the discrete values appear. For example, values appearing more than 10000 times are grouped into one category, values appearing 5000 to 10000 times are grouped into one category, and values appearing 1000 to 5000 times are grouped into one category.

TABLE 2

Original data table

| User ID | Name | Age | Gender | Region | Package fee | Call duration (minute) | Whether off-net |
|---------|------|-----|--------|--------|-------------|------------------------|-----------------|
| 1651654 | Wang XX | 28 | Female | Guangzhou | 128 | 150 | No |
| 1651655 | Li XX | 30 | Male | Shenzhen | 328 | 450 | No |
| 1651656 | Zhang XX | 16 | Male | Beijing | 188 | — | Yes |
| ... | | | | | | | |

Using the original data in Table 2 as an example, a specific procedure of processing the original data in Table 2 using the method for data processing in data modeling provided in the foregoing embodiment of the present disclosure includes obtaining the original data Table 2 and all preset multiple data processing category identifiers.

A corresponding data processing category identifier is determined according to the original data Table 2, that is, filling is performed for a missing value of a characteristic "call duration", and median filling is selected. Equi-width binning whose parameter is 10 is performed on a characteristic "age". If an age range is 1 to 50, five characteristics are generated, which are "ages from 1 to 10", "ages from 11 to 20", "ages from 21 to 30", "ages from 31 to 40", and "ages from 41 to 50".

Each characteristic in the original data is transformed according to a data transformation function corresponding to the data processing category identifier in order to generate a corresponding extended characteristic column. In this embodiment, data transformation is separately performed on only the characteristic "call duration" and the characteristic "age" in the original data, and generated corresponding extended characteristic columns are shown in Table 3 and Table 4.

TABLE 3

Extended characteristic column corresponding to "call duration"

| Call duration |
|---------------|
| 150 |
| 450 |
| 300 |
| ... |

TABLE 4

Extended characteristic columns corresponding to "age"

| Ages from 1 to 10 | Ages from 11 to 20 | Ages from 21 to 30 | Ages from 31 to 40 | Ages from 41 to 50 |
|---|---|---|---|---|
| | | 28 | | |
| | | 30 | | |
| | 16 | | | |
| | | ... | | |

Extended characteristic columns corresponding to all the characteristics in the original data are combined in order to generate combined extended characteristic columns, as shown in Table 5:

TABLE 5

Combined extended characteristic columns

| User ID | Name | Ages from 1 to 10 | Ages from 11 to 20 | Ages from 21 to 30 | Ages from 31 to 40 | Ages from 41 to 50 | Gender | Region | Package fee | Call duration | Whether off-net |
|---|---|---|---|---|---|---|---|---|---|---|---|
| 1651654 | Wang XX | | | 28 | | | 28 Female | Guangzhou | 128 | 150 | No |
| 1651655 | Li XX | | | 30 | | | 30 Male | Shenzhen | 328 | 450 | No |
| 1651656 | Zhang XX | | 16 | | | | 16 Male | Beijing | 188 | 300 | Yes |
| ... | | | | | | | | | | | |

One-hot encoding is performed on the combined extended characteristic columns in order to generate an extended characteristic set. In this embodiment of the present disclosure, only each characteristic of the age is encoded and described, and the other characteristics are not described herein, as shown in Table 6:

TABLE 6

Extended characteristic set obtained after one-hot encoding

| Ages from 1 to 10 | Ages from 11 to 20 | Ages from 21 to 30 | Ages from 31 to 40 | |
|---|---|---|---|---|
| ... | 0 | 0 | 1 | 0 | ... |
| | 0 | 0 | 1 | 0 | |
| | 0 | 1 | 0 | 0 | |
| | | ... | | |

Random sampling is performed on the extended characteristic set, and the extended characteristic set is divided into a training set and a validation set according to a ratio. Logistic regression training is performed on the training set according to each regularization coefficient in preset multiple regularization coefficients, for example, 0.01, 0.05, 0.1, or 0.2 in order to obtain a corresponding logistic regression function.

A target characteristic, for example, "region" or "package fee", is determined, and an accuracy coefficient of the logistic regression function corresponding to each regularization coefficient with respect to the target characteristic in the validation set is calculated. If the target characteristic is "region", which belongs to a classification characteristic, the accuracy coefficient is an accuracy rate. If the target characteristic is "package fee", which belongs to a continuous characteristic, the accuracy coefficient is a reciprocal of a quadratic sum of a mean error.

A logistic regression function generating a highest accuracy coefficient is selected, and a regularization coefficient corresponding to the logistic regression function is used as a target regularization coefficient, for example, 0.1.

Logistic regression training is performed on the entire extended characteristic set according to the obtained target regularization coefficient 0.1 in order to obtain a corresponding target logistic regression function, for example, f(x) =0.5*"ages from 21 to 30"+0.35*"gender being male"+ 0.45*"region being Beijing"+0.05*"ages from 1 to 10" . . .

An extended characteristic and a correlation coefficient of each characteristic are determined according to the target logistic regression function, that is, a weight corresponding to each characteristic in the target logistic regression function is used as the corresponding correlation coefficient, and sorting is performed in descending order according to values of the correlation coefficients, as shown in Table 7:

TABLE 7

Each characteristic and a corresponding correlation coefficient

| Characteristic | Correlation coefficient |
| --- | --- |
| Ages from 21 to 30 | 0.5 |
| Region being Beijing | 0.45 |
| Gender being male | 0.35 |
| ... | |
| Ages from 0 to 10 | 0.05 |
| ... | |

The characteristic whose correlation coefficient satisfies the specified condition may be selected as the important characteristic in the following two manners. A first manner includes selecting a characteristic whose correlation coefficient is greater than a specified correlation coefficient threshold (for example, 0.3) as the important characteristic, and a second manner includes sorting the characteristics in descending order according to the correlation coefficients, and selecting a specified quantity (for example, 3) of top-ranked characteristics as the important characteristics.

The important characteristics may be determined as "Ages from 21 to 30", "Region: Beijing", and "Gender: male" in the foregoing two manners.

Data columns corresponding to the important characteristics, that is, "Ages from 21 to 30", "Region being Beijing", and "Gender being male" are obtained by means of screening from the extended characteristic set, and are used as a final data processing result, as shown in Table 8.

TABLE 8

Data processing result

| User ID | Name | Ages from 21 to 30 | Gender | Region |
| --- | --- | --- | --- | --- |
| 1651654 | Wang XX | 1 | 0 | 0 |
| 1651655 | Li XX | 1 | 1 | 0 |
| 1651656 | Zhang XX | 0 | 1 | 1 |
| ... | | | | |

Data modeling is performed on the data processing result according to a data mining procedure in order to obtain a final data model.

Figure 3:
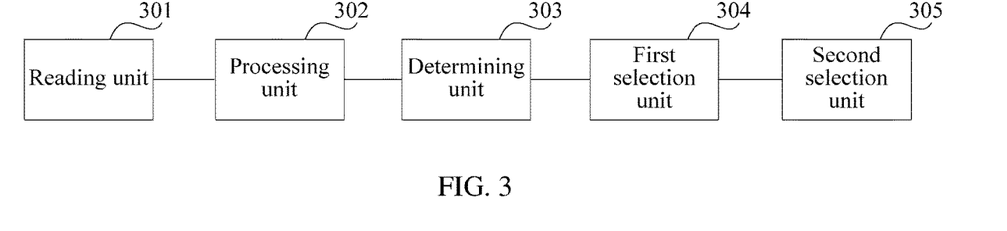
FIG. 3 is a schematic structural diagram of an apparatus for data processing in data modeling according to an embodiment of the present disclosure.

Based on the foregoing embodiment, the present disclosure further provides an apparatus for data processing in data modeling. Referring to FIG. 3, the apparatus includes a reading unit 301 configured to read original data and preset multiple data processing category identifiers, where each data column in the original data corresponds to one characteristic, a processing unit 302 configured to perform, according to a data transformation function corresponding to each data processing category identifier, data transformation on a data column corresponding to each characteristic in the original data in order to generate a corresponding extended characteristic column, and combine extended characteristic columns corresponding to all the characteristics in the original data in order to generate an extended characteristic set, a determining unit 303 configured to determine a correlation coefficient of each characteristic in the extended characteristic set, a first selection unit 304 configured to select a characteristic whose correlation coefficient satisfies a specified condition as an important characteristic, and a second selection unit 305 configured to obtain, by means of screening from the extended characteristic set, a data column corresponding to the important characteristic.

When performing data transformation on the data column corresponding to any characteristic in the original data in order to generate the corresponding extended characteristic column, the processing unit 302 is further configured to obtain, by means of screening from the multiple data processing category identifiers according to the data column corresponding to the characteristic, a target data processing category identifier corresponding to the characteristic, perform, according to a data transformation function corresponding to each target data processing category identifier obtained by means of screening, data transformation on the data column corresponding to the characteristic in order to generate an extended characteristic corresponding to the target data processing category identifier, and use all the extended characteristics corresponding to the target data processing category identifiers as the extended characteristic column of the characteristic.

When obtaining, by means of screening from the multiple data processing category identifiers according to the data column corresponding to the characteristic, the target data processing category identifier corresponding to the characteristic, the processing unit 302 is further configured to determine a data type of the characteristic according to the data column corresponding to the characteristic, and obtain, by means of screening from the multiple data processing category identifiers, a target data processing category identifier corresponding to the data type, where the data type includes a discrete type, and a continuous type, and/or determine a data defect type of the characteristic according to the data column corresponding to the characteristic, and obtain, by means of screening from the multiple data processing category identifiers, a target data processing category identifier corresponding to the data defect type, where the data defect type includes a missing value and an outlier.

When combining the extended characteristic columns corresponding to all the characteristics in the original data in order to generate the extended characteristic set, the processing unit 302 is further configured to combine the extended characteristic columns corresponding to all the characteristics in the original data, and perform one-hot encoding on each data column in the combined extended characteristic columns in order to generate the extended characteristic set.

After performing one-hot encoding on each data column in the combined extended characteristic columns in order to generate the extended characteristic set, the processing unit 302 is further configured to perform logic AND operation on any two data columns in the extended characteristic set in order to obtain a new data column, and add the new data column to the extended characteristic set.

The determining unit 303 is further configured to obtain a target regularization coefficient, and perform logistic regression training on the extended characteristic set based on the target regularization coefficient in order to obtain a corresponding target logistic regression function, and determine the correlation coefficient of each characteristic in the extended characteristic set according to the target logistic regression function.

When obtaining the target regularization coefficient, the determining unit 303 is further configured to obtain a preset target regularization coefficient, or obtain preset multiple regularization coefficients, and obtain the target regularization coefficient by means of screening from the preset multiple regularization coefficients based on the extended characteristic set.

When obtaining the target regularization coefficient by means of screening from the preset multiple regularization coefficients based on the extended characteristic set, the determining unit 303 is further configured to perform logistic regression training on the extended characteristic set according to each regularization coefficient in the preset multiple regularization coefficients in order to obtain a corresponding logistic regression function, and determine the target regularization coefficient according to the logistic regression function corresponding to each regularization coefficient, or perform a linear support vector machine operation on the extended characteristic set according to each regularization coefficient in the preset multiple regularization coefficients in order to obtain a corresponding support vector function, and determine the target regularization coefficient according to the support vector function corresponding to each regularization coefficient.

When performing logistic regression training on the extended characteristic set according to each regularization coefficient in the preset multiple regularization coefficients in order to obtain the corresponding logistic regression function, the determining unit 303 is further configured to perform sampling on the extended characteristic set according to a specified ratio in order to obtain a training set, and perform logistic regression training on the training set according to each regularization coefficient in the preset multiple regularization coefficients in order to obtain the corresponding logistic regression function.

When determining the target regularization coefficient according to the logistic regression function corresponding to each regularization coefficient, the determining unit 303 is further configured to use data in the extended characteristic set except the training set as a validation set, determine a target characteristic in all characteristics in the validation set, calculate an accuracy coefficient of the logistic regression function corresponding to each regularization coefficient with respect to the target characteristic in the validation set, and obtain, by means of screening, a logistic regression function corresponding to a highest accuracy coefficient, and use a regularization coefficient corresponding to the logistic regression function obtained by means of screening as the target regularization coefficient.

Optionally, when the target characteristic is a classification characteristic, the accuracy coefficient is any one of an accuracy rate, a recall rate, an F value, or an AUC, and the accuracy coefficient is a reciprocal of a quadratic sum of a mean error when the target characteristic is a continuous characteristic.

When determining the correlation coefficient of each characteristic in the extended characteristic set according to the target logistic regression function, the determining unit 303 is further configured to use a weight corresponding to each characteristic in the target logistic regression function as the correlation coefficient corresponding to the characteristic.

The first selection unit 304 is further configured to select a characteristic whose correlation coefficient is greater than a specified correlation coefficient threshold as the important characteristic, or sort the characteristics in descending order according to the correlation coefficients, and select a specified quantity of top-ranked characteristics as the important characteristics.

In conclusion, by means of the method and the apparatus for data processing in data modeling that are provided in the embodiments of the present disclosure, in the method, data transformation is performed on a data column corresponding to each characteristic in read original data according to a data transformation function corresponding to a preset data processing category identifier in order to generate a corresponding extended characteristic column, and extended characteristic columns corresponding to all the characteristics in the original data are combined in order to generate an extended characteristic set, a correlation coefficient of each characteristic in the extended characteristic set is determined, a characteristic whose correlation coefficient satisfies a specified condition is selected as an important characteristic, and a data column corresponding to the important characteristic is obtained by means of screening from the extended characteristic set. A calculation amount of assessing multiple data preprocessing methods is decreased in a manner of extending a characteristic, thereby avoiding problems of a long consumed time and a large calculation amount that are caused because data modeling is performed by exhaustively listing data preprocessing methods, and improving calculation efficiency. The important characteristic is selected by sorting correlation coefficients such that a quantity of characteristics may be controlled, which reduces a quantity of input data during data modeling and a calculation amount of a computer. In addition, a data preprocessing result adapts to multiple data modeling algorithms, thereby improving flexibility and adaptability of automatic data modeling.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for data processing in data modeling, wherein the method is implemented by a terminal device, the method comprising:

reading, by a processor of the terminal device, original data obtained by a transceiver of the terminal device, wherein the original data comprises a plurality of data columns, and wherein each of the plurality of data columns corresponds to a characteristic;

obtaining, by the processor, a preset plurality of data processing category identifiers, wherein each of the preset plurality of data processing category identifiers corresponds to a data transformation function;

performing, by the processor according to an obtained data transformation function, data transformation on a corresponding data column of the plurality of data columns to generate a corresponding extended characteristic column;

combining, by the processor, each extended characteristic column to generate an extended characteristic set, wherein the extended characteristic set comprises one or more extended characteristic columns obtained after the data transformation and one or more of the plurality of data columns where the data transformation is not performed;

determining, by the processor, a correlation coefficient of each characteristic in the extended characteristic set;

selecting, by the processor, a characteristic in the extended characteristic set whose correlation coefficient satisfies a specified condition as an important characteristic; and obtaining, by the processor by screening from the extended characteristic set, a data column and outputting the data column by the transceiver, the data column corresponding to the important characteristic that permits data modeling on the data column so as to reduce a calculation time for data processing and increase efficiency of computer resources.

2. The method of claim 1, wherein performing data transformation on the corresponding data column to generate the corresponding extended characteristic column comprises:

obtaining, by screening from the preset plurality of data processing category identifiers according to the corresponding data column corresponding to the characteristic, a target data processing category identifier corresponding to the characteristic;

performing, according to a data transformation function corresponding to each target data processing category identifier obtained by screening, the data transformation on the corresponding data column corresponding to the characteristic to generate an extended characteristic corresponding to the target data processing category identifier; and setting all the extended characteristics corresponding to target data processing category identifiers as the extended characteristic column of the characteristic.

3. The method of claim 2, wherein obtaining the target data processing category identifier comprises either:

determining a data type of the characteristic according to the corresponding data column corresponding to the characteristic, and obtaining, by screening from the preset plurality of data processing category identifiers, a target data processing category identifier corresponding to the data type, wherein the data type comprises a discrete type and a continuous type; or determining a data defect type of the characteristic according to the corresponding data column corresponding to the characteristic, and obtaining, by screening from the preset plurality of data processing category identifiers, a target data processing category identifier corresponding to the data defect type, wherein the data defect type comprises a missing value and an outlier.

4. The method of claim 1, wherein combining each of the extended characteristic columns to generate the extended characteristic set comprises:

combining extended characteristic columns corresponding to all characteristics in the original data; and performing one-hot encoding on each data column in the combined extended characteristic columns to generate the extended characteristic set.

5. The method of claim 4, wherein after performing the one-hot encoding on each of the data columns in the combined extended characteristic columns, the method further comprises:
performing logic AND operation on any two data columns in the extended characteristic set to obtain a new data column; and
adding the new data column to the extended characteristic set.

6. The method of claim 1, wherein determining the correlation coefficient of each characteristic in the extended characteristic set comprises:
obtaining a target regularization coefficient;
performing logistic regression training on the extended characteristic set based on the target regularization coefficient to obtain a corresponding target logistic regression function; and
determining the correlation coefficient of each characteristic in the extended characteristic set according to the corresponding target logistic regression function.

7. The method of claim 6, wherein obtaining the target regularization coefficient comprises either:
obtaining a preset target regularization coefficient; or
obtaining a preset plurality of regularization coefficients, and obtaining the target regularization coefficient by screening from the preset plurality of regularization coefficients based on the extended characteristic set.

8. The method of claim 7, wherein obtaining the target regularization coefficient by screening from the preset plurality of regularization coefficients comprises either:
performing the logistic regression training on the extended characteristic set according to each regularization coefficient in the preset plurality of regularization coefficients to obtain a corresponding logistic regression function, and determining the target regularization coefficient according to the corresponding logistic regression function; or
performing a linear support vector machine operation on the extended characteristic set according to each regularization coefficient in the preset plurality of regularization coefficients to obtain a corresponding support vector function, and determining the target regularization coefficient according to the corresponding support vector function.

9. The method of claim 8, wherein performing the logistic regression training on the extended characteristic set to obtain the corresponding logistic regression function comprises:
performing sampling on the extended characteristic set according to a specified ratio to obtain a training set; and
performing the logistic regression training on the training set according to each regularization coefficient in the preset plurality of regularization coefficients to obtain the corresponding logistic regression function.

10. The method of claim 8, wherein determining the target regularization coefficient according to the corresponding logistic regression function comprises:
setting data in the extended characteristic set except the training set as a validation set;
determining a target characteristic in all characteristics in the validation set;
calculating an accuracy coefficient of the corresponding logistic regression function corresponding to each regularization coefficient with respect to the target characteristic in the validation set;
obtaining, by screening, a logistic regression function corresponding to a highest accuracy coefficient; and
setting a regularization coefficient corresponding to the logistic regression function obtained by screening as the target regularization coefficient.

11. A terminal device for data processing in data modeling, comprising:
a transceiver;
a processor coupled to the transceiver; and
a computer-readable storage medium coupled to the processor and configured to store programming instructions for execution by the processor, wherein the programming instructions cause the processor to be configured to:
read original data obtained by the transceiver of the terminal device, wherein the original data comprises a plurality of data columns, wherein each of the plurality of data columns corresponds to a characteristic;
obtain a preset plurality of data processing category identifiers, wherein each of the preset plurality of data processing category identifiers corresponds to a data transformation function;
perform, according to an obtained data transformation function, data transformation on a corresponding data column of the plurality of data columns to generate a corresponding extended characteristic column;
combine each extended characteristic column to generate an extended characteristic set, wherein the extended characteristic set comprises one or more extended characteristic columns obtained after the data transformation and one or more of the plurality of data columns where the data transformation is not performed;
determine a correlation coefficient of each characteristic in the extended characteristic set;
select a characteristic in the extended characteristic set whose correlation coefficient satisfies a specified condition as an important characteristic; and
obtain, by screening from the extended characteristic set, a data column and output the data column via the transceiver, the data column corresponding to the important characteristic that permits data modeling on the data column so as to reduce a calculation time for data processing and increase efficiency of computer resources.

12. The terminal device of claim 11, wherein when performing the data transformation on the corresponding data column corresponding to each characteristic in the original data to generate the corresponding extended characteristic column, the programming instructions further cause the processor to be configured to:
obtain, by screening from the preset plurality of data processing category identifiers according to the corresponding data column corresponding to the characteristic, a target data processing category identifier corresponding to the characteristic;
perform, according to a data transformation function corresponding to each target data processing category identifier obtained by screening, the data transformation on the corresponding data column corresponding to the characteristic to generate an extended characteristic corresponding to the target data processing category identifier; and
set all the extended characteristics corresponding to target data processing category identifiers as the extended characteristic column of the characteristic.

13. The terminal device of claim 12, wherein when obtaining the target data processing category identifier corresponding to the characteristic, the programming instructions further cause the processor to be configured to either:

determine a data type of the characteristic according to the corresponding data column corresponding to the characteristic, and obtain, by screening from the preset plurality of data processing category identifiers, a target data processing category identifier corresponding to the data type, wherein the data type comprises a discrete type and a continuous type; or determine a data defect type of the characteristic according to the corresponding data column corresponding to the characteristic, and obtain, by screening from the preset plurality of data processing category identifiers, a target data processing category identifier corresponding to the data defect type, wherein the data defect type comprises a missing value and an outlier.

14. The terminal device of claim 11, wherein when combining each of the extended characteristic columns to generate the extended characteristic set, the programming instructions further cause the processor to be configured to:

combine extended characteristic columns corresponding to all characteristics in the original data; and perform one-hot encoding on each data column in the combined extended characteristic columns to generate the extended characteristic set.

15. The terminal device of claim 14, wherein after performing the one-hot encoding on each of the data columns in the combined extended characteristic columns to generate the extended characteristic set, the programming instructions further cause the processor to be configured to:

perform logic AND operation on any two data columns in the extended characteristic set to obtain a new data column; and add the new data column to the extended characteristic set.

16. The terminal device of claim 11, wherein the programming instructions further cause the processor to be configured to:

obtain a target regularization coefficient;

perform logistic regression training on the extended characteristic set based on the target regularization coefficient to obtain a corresponding target logistic regression function; and determine the correlation coefficient of each characteristic in the extended characteristic set according to the corresponding target logistic regression function.

17. The terminal device of claim 16, wherein when obtaining the target regularization coefficient, the programming instructions further cause the processor to be configured to either:

obtain a preset target regularization coefficient; or obtain a preset plurality of regularization coefficients, and obtain the target regularization coefficient by screening from the preset plurality of regularization coefficients based on the extended characteristic set.

18. The terminal device of claim 16, wherein when obtaining the target regularization coefficient by screening from the preset plurality of regularization coefficients, the programming instructions further cause the processor to be configured to either:

perform the logistic regression training on the extended characteristic set according to each regularization coefficient in the preset plurality of regularization coefficients to obtain a corresponding logistic regression function, and determine the target regularization coefficient according to the corresponding logistic regression function; or perform a linear support vector machine operation on the extended characteristic set according to each regularization coefficient in the preset plurality of regularization coefficients to obtain a corresponding support vector function, and determine the target regularization coefficient according to the corresponding support vector function.

19. The terminal device of claim 18, wherein when performing the logistic regression training on the extended characteristic set to obtain the corresponding logistic regression function, the programming instructions further cause the processor to be configured to:

perform sampling on the extended characteristic set according to a specified ratio to obtain a training set; and perform the logistic regression training on the training set according to each regularization coefficient in the preset plurality of regularization coefficients to obtain the corresponding logistic regression function.

20. The terminal device of claim 19, wherein when determining the target regularization coefficient according to the corresponding logistic regression function, the programming instructions further cause the processor to be configured to:

set data in the extended characteristic set except the training set as a validation set;

determine a target characteristic in all characteristics in the validation set;

calculate an accuracy coefficient of the corresponding logistic regression function corresponding to each regularization coefficient with respect to the target characteristic in the validation set;

obtain, by screening, a logistic regression function corresponding to a highest accuracy coefficient; and set a regularization coefficient corresponding to the logistic regression function obtained by screening as the target regularization coefficient.

* * * * *